(12) United States Patent
Owens et al.

(10) Patent No.: US 10,733,370 B2
(45) Date of Patent: Aug. 4, 2020

(54) METHOD, APPARATUS, AND COMPUTER PROGRAM PRODUCT FOR GENERATING A PREVIEW OF AN ELECTRONIC DOCUMENT

(71) Applicant: Change Healthcare Holdings, LLC, Nashville, TN (US)

(72) Inventors: Ian Owens, Arvada, CO (US); Tammy Williams, Golden, CO (US)

(73) Assignee: Change Healthcare Holdings, LLC, Nashville, TN (US)

( * ) Notice: Subject to any disclaimer, the term of this patent is extended or adjusted under 35 U.S.C. 154(b) by 341 days.

(21) Appl. No.: 14/828,880

(22) Filed: Aug. 18, 2015

(65) Prior Publication Data
US 2017/0052943 A1  Feb. 23, 2017

(51) Int. Cl.
   G06F 3/00       (2006.01)
   G06F 40/186     (2020.01)
   G06F 40/14      (2020.01)
   G06F 40/106     (2020.01)

(52) U.S. Cl.
   CPC .......... G06F 40/186 (2020.01); G06F 40/106 (2020.01); G06F 40/14 (2020.01)

(58) Field of Classification Search
   CPC .. G06F 17/248; G06F 17/2247; G06F 40/186; G06F 40/14; G06F 40/106
   See application file for complete search history.

(56) References Cited

U.S. PATENT DOCUMENTS

| | | | | |
|---|---|---|---|---|
| 6,684,188 | B1 * | 1/2004 | Mitchell | G06F 17/243 128/924 |
| 6,832,351 | B1 * | 12/2004 | Batres | G06F 17/243 705/34 |
| 7,930,632 | B2 * | 4/2011 | Takashima | G06F 17/211 715/243 |
| 8,682,993 | B1 * | 3/2014 | Bell | G06F 19/322 709/206 |
| 8,782,519 | B1 * | 7/2014 | Gajjar | G06F 17/2745 715/200 |
| 9,298,780 | B1 * | 3/2016 | Madhani | G06F 16/258 |
| 9,659,043 | B2 * | 5/2017 | DaCosta | G06F 17/30321 |
| 9,740,788 | B2 * | 8/2017 | Blank, Jr. | G06F 17/30867 |

(Continued)

FOREIGN PATENT DOCUMENTS

WO   WO-2017146728 A1 *   8/2017   ........ G06F 17/2211

*Primary Examiner* — Kyle R Stork
(74) *Attorney, Agent, or Firm* — Myers Bigel, P.A.

(57) ABSTRACT

Embodiments provided herein provide for customized previews of electronic documents. A template for a particular electronic document may be identified based on document attributes and/or usage parameters. The identified template may define pertinent data to be extracted from structured documents. Portions of documents, including unstructured documents can be provided as a preview such as by rendering an area of the document such as one defined in the template by coordinates or pixels. In this regard, individual users or user groups may configure what data is displayed in a document preview such as by selecting fields and/or by specifying locations of interest within the document. Users can view listings of documents and their respective previews such that the desired document may be identified without rendering complete documents.

14 Claims, 5 Drawing Sheets

(56) References Cited

U.S. PATENT DOCUMENTS

| | | | |
|---|---|---|---|
| 2003/0055871 A1* | 3/2003 | Roses | G06F 17/3089 709/203 |
| 2004/0015890 A1* | 1/2004 | Wong | G06F 9/44505 717/137 |
| 2005/0010860 A1* | 1/2005 | Weiss | G06F 17/30905 715/205 |
| 2005/0273365 A1* | 12/2005 | Baumgartner | G06F 19/321 705/3 |
| 2006/0010370 A1* | 1/2006 | Bodin | G06Q 30/02 715/234 |
| 2006/0179028 A1* | 8/2006 | Bram | G06N 5/043 706/47 |
| 2007/0028166 A1* | 2/2007 | Hundhausen | G06F 17/212 715/205 |
| 2008/0065634 A1* | 3/2008 | Krinsky | G06F 17/30867 |
| 2008/0235221 A1* | 9/2008 | Burns | G06F 17/30716 |
| 2009/0089250 A1* | 4/2009 | Stieber | G06F 17/30011 |
| 2009/0157987 A1* | 6/2009 | Barley | G06Q 20/409 711/154 |
| 2009/0228531 A1* | 9/2009 | Baumann | G06F 11/1451 |
| 2009/0249181 A1* | 10/2009 | Bloom | G06F 17/248 715/209 |
| 2009/0287746 A1* | 11/2009 | Brown | G06F 17/30011 |
| 2010/0037150 A1* | 2/2010 | Sawant | G06F 17/30896 715/753 |
| 2010/0070448 A1* | 3/2010 | Omoigui | H01L 27/1463 706/47 |
| 2010/0185651 A1* | 7/2010 | Crow | G06F 16/34 707/769 |
| 2010/0228721 A1* | 9/2010 | Mok | G06F 17/30554 707/711 |
| 2010/0312766 A1* | 12/2010 | Horn | G06F 17/3002 707/737 |
| 2011/0107204 A1* | 5/2011 | Cohen | G06F 17/211 715/243 |
| 2011/0145698 A1* | 6/2011 | Penov | G06F 17/272 715/235 |
| 2012/0054617 A1* | 3/2012 | Bachman | G06F 17/30017 715/723 |
| 2012/0066197 A1* | 3/2012 | Rana | G06F 19/322 707/706 |
| 2012/0084644 A1* | 4/2012 | Robert | G06F 9/4443 715/255 |
| 2012/0117468 A1* | 5/2012 | Ragan | G06F 3/04817 715/273 |
| 2012/0166973 A1* | 6/2012 | Gurevich | G06F 17/30864 715/760 |
| 2012/0215864 A1* | 8/2012 | Fukuoka | G06Q 10/10 709/206 |
| 2012/0328259 A1* | 12/2012 | Seibert, Jr. | G06F 17/212 386/230 |
| 2013/0018904 A1* | 1/2013 | Mankala | G06F 17/30011 707/756 |
| 2013/0035957 A1* | 2/2013 | Gossler | A61B 5/055 705/3 |
| 2013/0117656 A1* | 5/2013 | Verlaan | G06F 17/30896 715/234 |
| 2013/0145251 A1* | 6/2013 | Jureidini | G06F 17/30896 715/234 |
| 2013/0151936 A1* | 6/2013 | Hsu | G06F 17/30864 715/205 |
| 2013/0212132 A1* | 8/2013 | Rogers | G06F 17/30867 707/803 |
| 2013/0290837 A1* | 10/2013 | Hudetz | G06F 17/212 715/255 |
| 2014/0006369 A1* | 1/2014 | Blanchflower | G06F 17/30985 707/706 |
| 2014/0075283 A1* | 3/2014 | Coursol | G06F 17/3089 715/234 |
| 2014/0237536 A1* | 8/2014 | Jang | H04N 21/43 725/131 |
| 2014/0245196 A1* | 8/2014 | Zheng | G06F 8/38 715/762 |
| 2014/0280055 A1* | 9/2014 | Chang | G06F 16/9535 707/722 |
| 2014/0301663 A1* | 10/2014 | Livingston | G06T 3/40 382/298 |
| 2015/0039651 A1* | 2/2015 | Kinsely | G06F 17/30563 707/779 |
| 2015/0121184 A1* | 4/2015 | Steinmann | G06F 17/2247 715/205 |
| 2015/0149884 A1* | 5/2015 | Wagner | G06F 17/2247 715/234 |
| 2015/0154156 A1* | 6/2015 | Meyers, Jr. | G06F 17/2235 715/205 |
| 2015/0248429 A1* | 9/2015 | Pregueiro | G06F 17/212 715/202 |
| 2015/0347352 A1* | 12/2015 | Narayanan | G06Q 10/10 715/222 |
| 2016/0004820 A1* | 1/2016 | Moore | H04W 4/21 705/3 |
| 2016/0092245 A1* | 3/2016 | Hogue | G06F 9/4446 715/711 |
| 2016/0098596 A1* | 4/2016 | Gopalakrishnan | G06K 9/00456 382/224 |
| 2016/0110316 A1* | 4/2016 | Carter | G06F 17/212 715/273 |
| 2016/0147946 A1* | 5/2016 | Von Reden | G16H 10/60 705/3 |
| 2016/0323217 A1* | 11/2016 | Subramani | H04L 51/08 |
| 2016/0371238 A1* | 12/2016 | Heavenrich | G06F 17/2264 |
| 2017/0076046 A1* | 3/2017 | Barnes | G06F 17/30864 |
| 2017/0116179 A1* | 4/2017 | Gagne-Langevin | G06F 17/2725 |
| 2017/0228470 A1* | 8/2017 | DaCosta | G06F 17/30958 |
| 2017/0300585 A1* | 10/2017 | Blank, Jr. | G06F 17/30864 |

* cited by examiner

METHOD, APPARATUS, AND COMPUTER PROGRAM PRODUCT FOR GENERATING A PREVIEW OF AN ELECTRONIC DOCUMENT

TECHNOLOGICAL FIELD

Embodiments of the present invention relate generally to computer technology and, more particularly, to methods, apparatuses, and computer program products for generating previews of electronic documents.

BACKGROUND

The widespread use of modern computing technology has led to an increasing demand for information to be captured and made available via computer-based applications. The vast repositories of data and information made available to end users help improve the availability and exchange of electronic information, but make locating the desired data difficult. The various formats used to create such documents make it even more difficult to quickly distinguish the pertinent data from the documents or to integrate all document formats to be compatible across systems via a single interface.

The medical services industry in particular relies on sophisticated systems to collect, store and maintain patient data, procedures, policies, and the like. In some situations it may be beneficial to make the information available across different health information systems, such as via a centralized interface made accessible to various authorized users. Nurses, doctors, and other medical professionals may enter and access patient information using computer based applications from their respective practices. The authorized users may access electronic health records, billing and insurance information, and other documents from different locations such as other providers, health information systems, databases, and the like. The number and complexity of documents made available to a practitioner may make it difficult for the practitioner to identify the documents that are needed.

BRIEF SUMMARY OF SOME EXAMPLE EMBODIMENTS

As described herein, methods, apparatuses, and computer program products provide for generating previews of electronic documents. In example embodiments, a list of electronic documents may be processed such that pertinent preview data is extracted or generated from the electronic document, and rendered. The preview data may be displayed to a user so that the user may consider the preview data and easily determine whether the electronic document is relevant or useful to the user.

A method is provided including receiving an indication of an electronic document, identifying a template associated with the electronic document, based on at least one of a document attribute associated with the electronic document or a usage parameter, and with an electronic document preview apparatus comprising at least processing circuitry, determining preview data from the electronic document based on the template.

In some examples, the template is identified based on the document attribute, wherein the document attribute comprises at least one of a document name, a providing source of the electronic document, or a file type associated with the electronic document.

In some embodiments, determining preview data comprises determining the electronic document is a structured document, parsing discrete data from the electronic document based on the template, and generating the preview data based on the parsed discrete data and the template.

In some examples, the discrete data comprises multiple instances of a same data element, and the parsing further comprises processing the multiple instances of the same data element to determine which instance or instances to include in the preview data.

In some embodiments, determining the preview data comprises determining the electronic document is an unstructured document, identifying a location within the unstructured document based on the template, and generating the preview data based on the location. In some examples the template is determined based on the usage parameter, wherein the usage parameter comprises at least one of a user identity, a device type, or a location. In some embodiments, the template indicates at least the data elements to be included in the preview data, and a format in which the preview data is to be displayed.

An apparatus is also provided, comprising at least one processor and at least one memory including computer program code, the at least one memory and the computer program code configured to, with the processor, cause the apparatus to at least receive an indication of an electronic document, identify a template associated with the electronic document, based on at least one document attribute associated with the electronic document or at least one usage parameter, determine preview data from the electronic document based on the template.

A computer program product is provided, comprising at least one non-transitory computer-readable medium having computer-readable program instructions stored therein, the computer-readable program instructions comprising instructions, which when performed by an apparatus, are configured to cause the apparatus to perform at least receive an indication of an electronic document, identify a template associated with the electronic document, based on at least one of a document attribute associated with the electronic document or a usage parameter, and determine preview data from the electronic document based on the template.

An apparatus is also provided, comprising means for receiving an indication of an electronic document, means for identifying a template associated with the electronic document, based on at least one of a document attribute associated with the electronic document or a usage parameter, and means for determining preview data from the electronic document based on the template.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
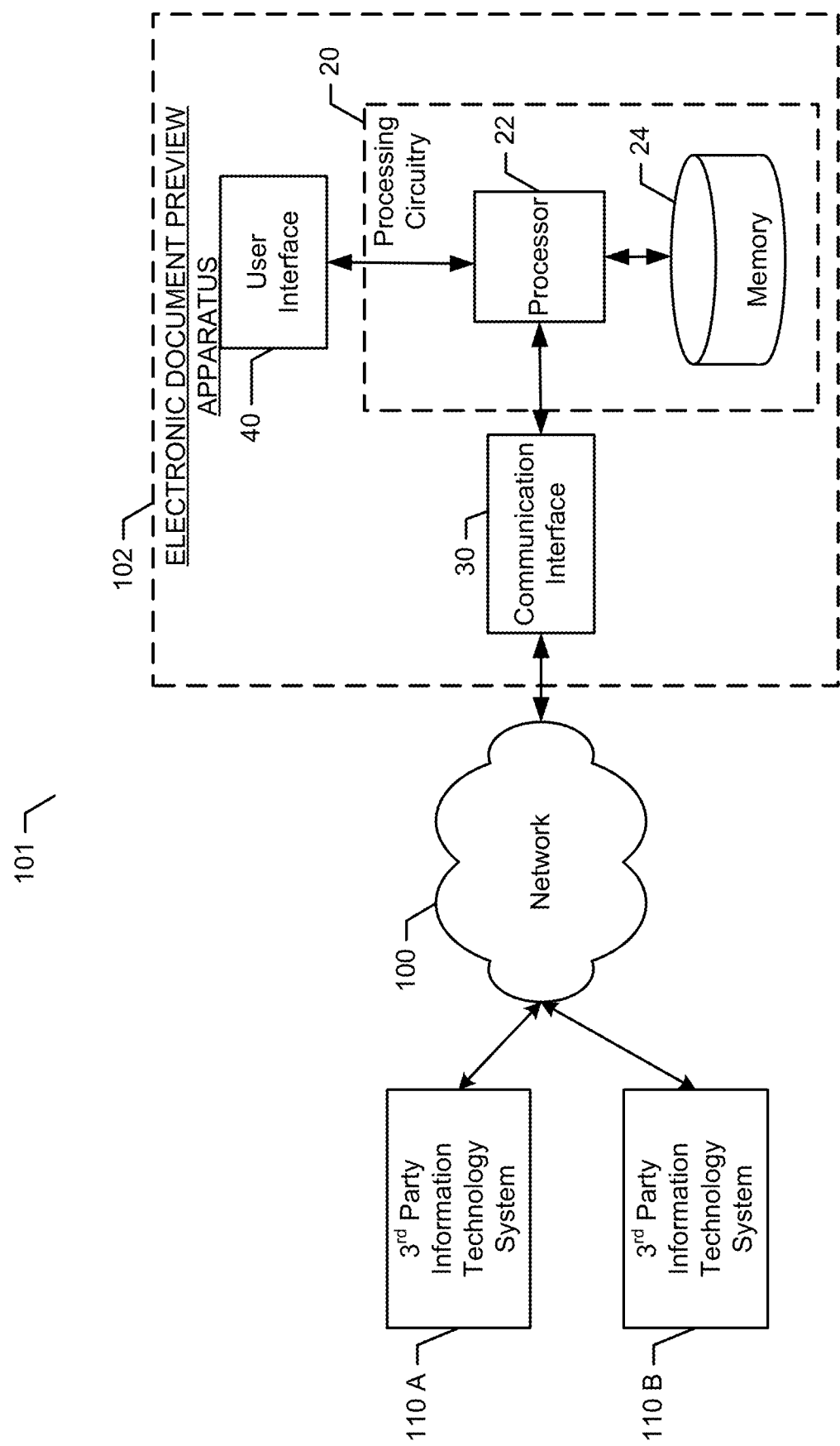
Figure 2:
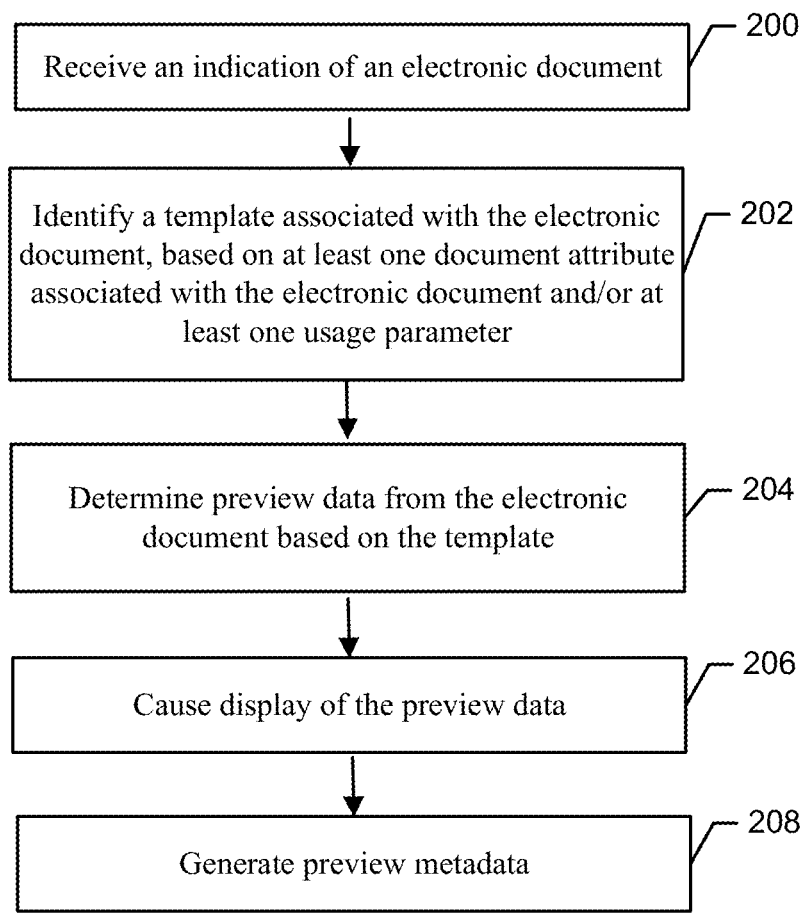
Figure 4:
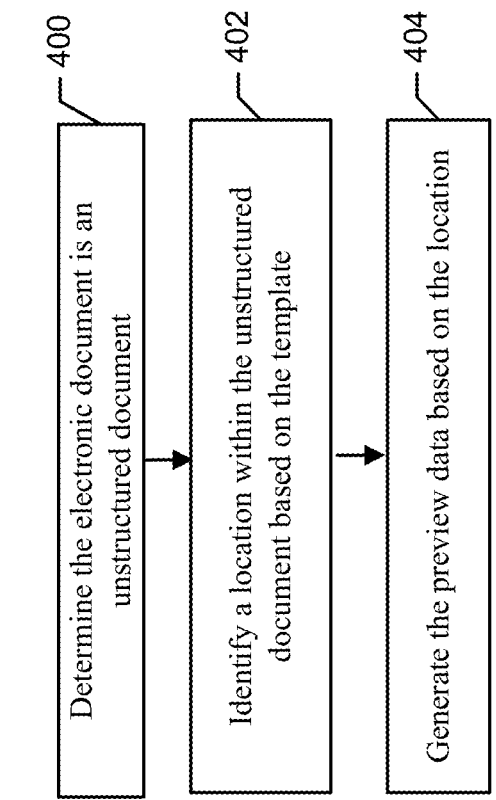
Figure 3:
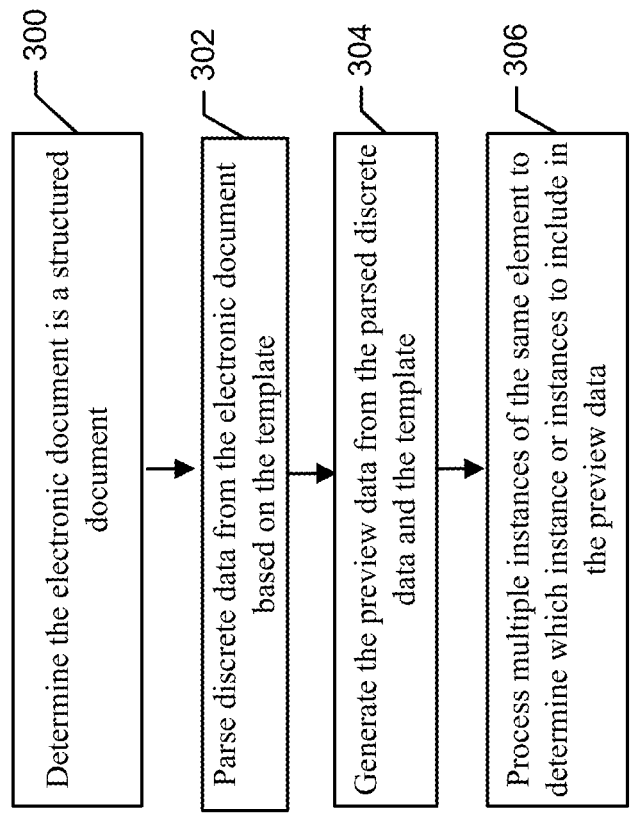
Figure 5A:
Figure 5B:
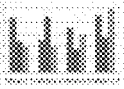
Figure 6:
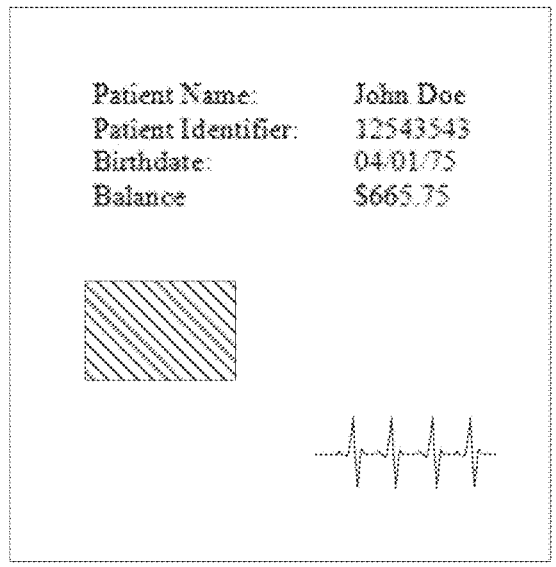
Figure 7A:
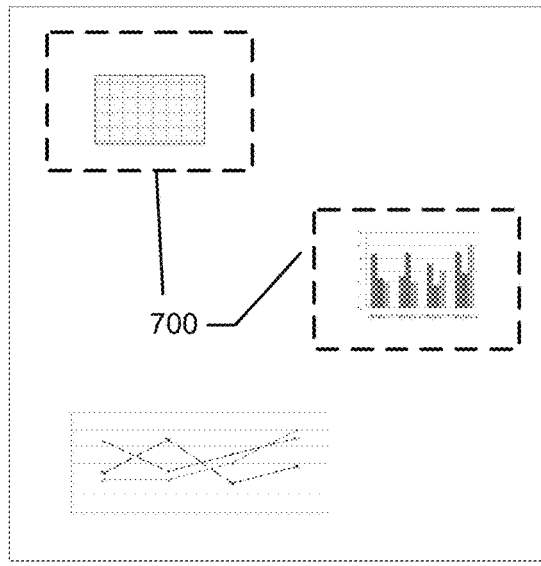
Figure 7B:
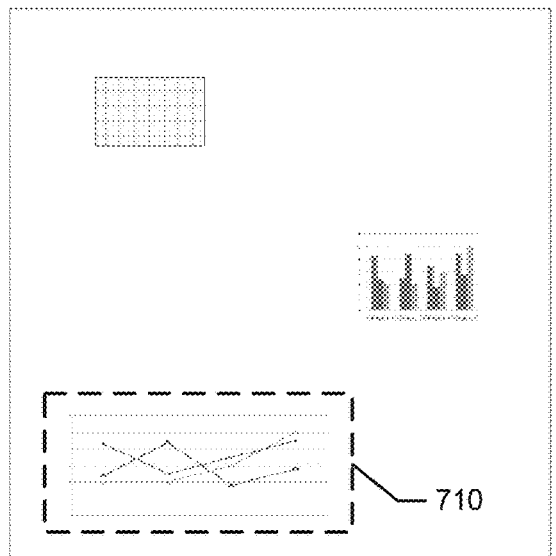

Having thus described embodiments of the invention in general terms, reference will now be made to the accompanying drawings, which are not necessarily drawn to scale, and wherein:

FIG. 1 illustrates third party information technology systems connected to a document preview apparatus over a network according to some example embodiments;

FIGS. 2-4 illustrate flowcharts of operations for generating document previews according to some example embodiments;

FIGS. 5A and 5B illustrate electronic document listings and corresponding document previews according example embodiments; and FIGS. 6, 7A, and 7B illustrate electronic documents according to example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the another computing device and/or may be received indirectly via one or more intermediary computing devices, such as, for example, one or more servers, relays, routers, network access points, and/or the like. Similarly, where a computing device is described herein to send data to another computing device, it will be appreciated that the data may be sent directly to the another computing device or may be sent to the another computing device via one or more interlinking computing devices, such as, for example, one or more servers, relays, routers, network access points, and/or the like.

FIG. 1 illustrates a system including any number of third party information technology systems connected to a document preview apparatus over a network, according to some example embodiments. It will be appreciated that the system of FIG. 1 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, numerous other configurations may also be used to implement embodiments of the present invention.

The system 101 may include any number of third party information technology systems 110, such as 110A and 110B, that hereinafter may be referred to as system(s) 110. System(s) 110 may be configured to communicate with electronic document preview apparatus 102 over network 100, and may be maintained by an entity such as a healthcare provider, pharmacy, lab, state agency, health information exchange, and/or insurance provider. System(s) 110 may be implemented in a variety of configurations, such as a personal computer, laptop, one or more servers, distributed system, cloud based entity, or the like, and may be accessed by users performing patient charting, medical billing, and/or the like in accordance with example embodiments described herein. In this regard, the system 110 may generate, maintain, and/or provide electronic documents. For example, a user of system 110 may initiate a search or query operation to return a listing of electronic documents meeting a set of criteria.

In some embodiments, system 110A may be associated with a separate medical practice from the medical practice associated with system 110B. It will be appreciated that while the medical and healthcare industries are referred to while describing example embodiments provided herein, many other implementations, and industries may benefit from the embodiments provided herein.

System(s) 110 may be directly coupled to electronic document preview apparatus 102, or may access electronic document preview apparatus 102 over a network 100. Network 100 may be embodied in a local area network, the Internet, any other form of a network, or in any combination thereof, including proprietary private and semi-private networks and public networks. The network 100 may comprise a wireline network, wireless network (e.g., a cellular network, wireless local area network, wireless wide area network, some combination thereof, or the like), or a combination thereof, and in some example embodiments comprises at least a portion of the Internet.

In some example embodiments, electronic document preview apparatus 102 may be embodied as or comprise one or more computing devices, such as, by way of non-limiting example, a server, configured to access network 100. In some example embodiments, electronic document preview apparatus 102 may be implemented as a distributed system or a cloud based entity that may be implemented within network 100. In this regard, electronic document preview apparatus 102 may comprise one or more servers, a server cluster, one or more network nodes, a cloud computing infrastructure, some combination thereof, or the like. Electronic document preview apparatus 102 may be implemented within a health information system, such as system(s) 110. In this regard, the system 101 may be considered an electronic data interchange, or may be considered to comprise an electronic data interchange of information among various entities, such as hospitals, information technology vendors, clinics, insurance processors, and/or the like. As described herein, electronic document preview apparatus 102 may generate previews of documents, such as those provided by system 110, such that end users can view previews of the documents to determine the relevancy of the document for their particular use.

The electronic document preview apparatus 102 of FIG. 1 illustrates an example configuration according to some embodiments, such as, for example, in an embodiment in which electronic document preview apparatus 102 is implemented as a server. It will be appreciated that the components illustrated and described below may not be mandatory and thus some may be omitted in certain embodiments. Additionally, some embodiments may include further or different components, devices, or elements beyond those illustrated in and described with respect to FIG. 1.

The electronic document preview apparatus 102 of one example embodiment includes processing circuitry 20. Processing circuitry 20 may be configured to perform actions in accordance with one or more example embodiments disclosed herein. In this regard, the processing circuitry 20 may be configured to perform and/or control performance of one or more functionalities of the electronic document preview apparatus 102 in accordance with various example embodiments. The processing circuitry 20 may be configured to perform data processing, application execution, and/or other processing and management services according to one or more example embodiments. In some embodiments, the electronic document preview apparatus 102 or a portion(s) or component(s) thereof, such as the processing circuitry 20, may be embodied as or comprise a circuit chip. The circuit chip may constitute means for performing one or more operations for providing the functionalities described herein.

In some example embodiments, the processing circuitry 20 may include a processor 22 and, in some embodiments, such as that illustrated in FIG. 1, may further include memory 24. The processing circuitry 20 may be in communication with or otherwise control a user interface 40, and/or a communication interface 30. As such, the processing circuitry 20 may be embodied as a circuit chip (e.g., an integrated circuit chip) configured (e.g., with hardware, software, or a combination of hardware and software) to perform operations described herein.

The processor 22 may be embodied in a number of different ways. For example, the processor 22 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 22 may comprise a plurality of processors. The plurality of processors may be in operative communication with each other and may be collectively configured to perform one or more functionalities of electronic document preview apparatus 102 as described herein. The plurality of processors may be embodied on a single computing device or distributed across a plurality of computing devices collectively configured to function as the electronic document preview apparatus 102. In some example embodiments, the processor 22 may be configured to execute instructions stored in the memory 24 or otherwise accessible to the processor 22. As such, whether configured by hardware or by a combination of hardware and software, the processor 22 may represent an entity (e.g., physically embodied in circuitry—in the form of processing circuitry 20) capable of performing operations according to embodiments of the present invention while configured accordingly. Thus, for example, when the processor 22 is embodied as an ASIC, FPGA, or the like, the processor 22 may be specifically configured hardware for conducting the operations described herein. Alternatively, as another example, when the processor 22 is embodied as an executor of software instructions, the instructions may specifically configure the processor 22 to perform one or more operations described herein.

In some example embodiments, the memory 24 may include one or more non-transitory memory devices such as, for example, volatile and/or non-volatile memory that may be either fixed or removable. In this regard, the memory 24 may comprise a non-transitory computer-readable storage medium. It will be appreciated that while the memory 24 is illustrated as a single memory, the memory 24 may comprise a plurality of memories. The plurality of memories may be embodied on a single computing device or may be distributed across a plurality of computing devices collectively configured to function as the electronic document preview apparatus 102. The memory 24 may be configured to store information, data, applications, instructions and/or the like for enabling the electronic document preview apparatus 102 to carry out various functions in accordance with one or more example embodiments. For example, the memory 24 may be configured to buffer input data for processing by the processor 22. Additionally or alternatively, the memory 24 may be configured to store instructions for execution by the processor 22. As yet another alternative, the memory 24 may include one or more databases that may store a variety of files, contents, or data sets. Among the contents of the memory 24, applications may be stored for execution by the processor 22 to carry out the functionality associated with each respective application. In some cases, the memory 24 may be in communication with one or more of the processor 22, user interface 40, or communication interface 30, for passing information among components of electronic document preview apparatus 102.

The user interface 40 may be in communication with the processing circuitry 20 to receive an indication of a user input at the user interface 40 and/or to provide an audible, visual, mechanical, or other output to the user. As such, the user interface 40 may include, for example, a keyboard, a mouse, a joystick, a display, a touch screen display, a microphone, a speaker, and/or other input/output mechanisms. In some example embodiments in which the electronic document preview apparatus 102 is embodied as a server, cloud computing system, or the like, aspects of user interface 40 may be limited or the user interface 40 may not be present. Accordingly, the user interface 40 may provide input and output means to facilitate document preview operations in accordance with one or more example embodiments.

The communication interface 30 may include one or more interface mechanisms for enabling communication with other devices and/or networks. In some cases, the communication interface 30 may be any means such as a device or circuitry embodied in either hardware, or a combination of hardware and software that is configured to receive and/or transmit data from/to a network and/or any other device or module in communication with the processing circuitry 20. By way of example, the communication interface 30 may be configured to enable electronic document preview apparatus 102 to communicate with system(s) 110. Accordingly, the communication interface 30 may, for example, include supporting hardware and/or software for enabling communications via cable, digital subscriber line (DSL), universal serial bus (USB), Ethernet, or other methods.

FIG. 2 is a flowchart of operations according to some embodiments. Operations illustrated in FIG. 2 may be performed by an electronic document preview apparatus 102 and, more particularly, may be performed by, with the assistance of, and/or under the control of one or more of the processing circuitry 20, processor 22, memory 24, user interface 40, and/or communication interface 30.

Referring to FIG. 2, operation 200, the electronic document preview apparatus 102, may include means, such as processing circuitry 20, processor 22, memory 24, communication interface 30, or the like, for receiving an indication of an electronic document. The indication of the electronic document may include any of: 1) a unique identifier of the document that may be used to identify and/or retrieve the document, 2) any other data, such as document metadata, that may be used to identify and/or retrieve the document, and/or 3) the electronic document itself. Example scenarios by which the electronic document preview apparatus 102 may receive an indication of an electronic document include but are not limited to the two scenarios below:

Scenario 1: The Indication of the Electronic Document is Received as a Result of a Search Operation A user may perform a query, such as a request for documents relating to a particular patient or a keyword search, for example. The electronic document preview apparatus 102 may run the query, and/or communicate with a third party system 110 that may run the query, to obtain a list of results identifying indication(s) of one or more electronic documents meeting the search criteria. As another example, a user may browse a directory structure, which directly comprises electronic documents. In some examples, if a large number of indications associated with a corresponding large number of electronic documents are received at once, such as from a search result or identified as residing within a selected directory, the electronic document preview apparatus 102 may process either one or a predefined number of indications at a time according to the operations described herein.

Processing one or a predefined number of electronic document indications at a time may enable the electronic document preview apparatus 102 to efficiently generate previews for display for only a subset of documents in a larger list of search results or directory contents. In such an example, the electronic document preview apparatus 102 may control a display comprising a document name or other identifier, and a corresponding document preview, as the document previews are generated. In some examples, the document previews may be generated as a user scrolls, or sequentially as the documents are listed (and possibly regardless of user scrolling). In this regard, the order in which the document previews are generated could change based on a user input to sort or re-order the list of documents.

Scenario 2: The Indication of the Electronic Document is Received Independently of a Search Operation A third party system 110 may transmit indication(s) of one or more electronic documents to the electronic document preview apparatus 102. In this regard, the electronic document preview apparatus 102 may generate document previews independently of any search or query, such as by batch processes or individual request. In some examples, the electronic document preview apparatus 102 may generate a document preview as described below, and return the document preview as an image to the third party system 110. As another example, the document preview apparatus 102 may return preview metadata to the third party system 110, such that the third party system 110 may generate and/or recreate the preview for a particular document on demand or in the future, based on the preview metadata. The third party system 110 may therefore cache the preview image or preview metadata for subsequent use without having to request the preview from the electronic document preview apparatus 102 again.

Continuing with operation 200, in examples in which the electronic document itself is not received by the electronic document preview apparatus 102 with or as a part of the indication, the document preview apparatus 102 may identify and retrieve, from another location, the electronic document associated with an indication based on the unique identifier and/or document metadata. Alternatively, the electronic documents, which also may be simply referred to herein as documents, may be provided to the electronic document preview apparatus 102 with the indications of the documents, or in association, such that the document preview apparatus 102 may identify the electronic document associated with an indication.

An electronic document may include structured or unstructured data. Structured data may include XML (extensible mark-up language), or any other data in a predefined format such as a CCDA (Consolidated-Clinical Document Architecture). Other examples include data compatible with ICD9 and ICD10 (International Classification of Diseases), HL7 (Health Level 7) and/or other codified medical data. In some examples, the document may have an associated type and/or format of structured data. Therefore, the structured data may be parsed, such as by an XML parser or other parsers or programs capable of extracting data from the document. The structured data format may therefore enable the electronic document preview apparatus 102 to parse the data for particular data points of interest.

Documents that are unstructured may include those without recognized types, or may include documents that the electronic document preview apparatus 102 may render, but may be unable to parse to extract discrete data. Both structured and unstructured documents may include images and/or text. Preview data may be extracted and/or generated from structured and/or unstructured documents according to the operations described below.

As shown by operation 202, the electronic document preview apparatus 102 may include means, such as processing circuitry 20, processor 22, memory 24, or the like, for identifying a template associated with the electronic document, based on at least one document attribute associated with the electronic document and/or at least one usage parameter. Document attributes and usage parameters are described below.

Document Attributes

A document attribute may be any data describing or characterizing the electronic document, and may include but is not limited to, a document name or portion thereof, a providing source of the document (such as third party system 110, user, user group, business entity or the like), or a file type (such as file extension or a predefined file classification recognized by the electronic document preview apparatus 102) associated with the document.

The providing source may include an identifier of a particular system 110, user, entity, organization, and/or the like, from which the file originated. The file type of, or associated with, the document may be included with the indication of the document provided to the electronic document preview apparatus 102. The file type may include unique identifiers by which the electronic document preview apparatus 102 can determine an associated template, as described below.

In some examples, a document attribute may be determined from the indication (i.e., from the unique identifier of the document or document metadata) or the electronic document itself, such as by extracting a predefined data element or elements from the document. The document attribute may therefore include data included in or derived from document metadata, such as data received from a system 110 along with the electronic document or saved in association with the electronic document, such as in a data store or memory 24. The document metadata may therefore indicate the document attribute. Still further, a document attribute may include data extracted from the document itself, such as from predefined tags. For example, a document type, name, source, or other similar attribute may be embedded in a structured document.

Usages Parameters

A usage parameter may include any characteristic relating to the use of the preview data in a particular instance, such as but not limited to a user identity, a device type, or a location. For example, a usage parameter may include a user identifier or user group identifier, such as those relating to a particular entity, clinic, organization, or the like associated with the viewer of the preview data to be generated. Different users or user identities may have different associated rules or templates defining what data is incorporated into the preview, as described in further detail hereinafter.

A usage parameter of device type may include an indication of a mobile device or personal computer, and/or may further include platform or operating system types. Accessing the preview data via a mobile device may result in less data than what would be provided on a personal computer or laptop. Furthermore, subheadings or data could be abbreviated on the mobile device to save space and fit more detail on the display.

Still further, a usage parameter may include a location. The location may include a real time location of the device and/or network types from which the preview data is accessed. The usage parameter may therefore indicate whether the user is accessing the preview data from inside a clinic (e.g., on a local area network), from a home device or network, or from a public network such as inside a coffee shop. The location may be determined with a global position system (GPS) or based on network information.

Continuing with operation 202, in addition to identifying the template based on at least one document attribute and/or usage parameter, the electronic document preview apparatus 102 may identify the template associated with the electronic document via a hierarchy or series of test conditions, such as those relating to a document attribute and/or usage parameter, such that the identified template is narrowed, possibly gradually, from a plurality of available templates. Any or all of the below described test conditions may be used to narrow the plurality of available templates to the single associated template or a remaining subset of available templates, the latter of which may result in a repetition of test conditions until a single template is identified. In some examples, only a subset of test conditions may be used to identify the template associated with the electronic document. The order presented below represents one example hierarchical order of test conditions used to identify the associated template, but it will be appreciated that the test conditions may be applied in any order.

First, as an example test condition, a document name associated with the received indication of the electronic document may be processed to determine if one or more templates are associated with the document name. For example, a document attribute may include a document name such as "patient chart" "monthly bill," "vaccination history," "vital signs," or the like. In this regard, the electronic document preview apparatus 102 may apply predefined patterns, including wild card patterns, to the document name to identify a template or remaining subset of available templates from the plurality of available templates.

In an example in which the document name pattern matching narrows the templates to a remaining subset of available templates, the document preview apparatus 102 may test an additional condition(s). For example, for each of the templates in the remaining subset of available templates, the originating source of the electronic document may be compared against an associated source of the respective templates. In some examples, only one template of the remaining subset of available templates may have an associated source matching the source of the document, so that template may be identified as the associated template.

If the most recent condition tested still results in a remaining subset of available templates, additional conditions may be tested until a single template is identified. The remaining conditions may relate to any of the document attributes or usage parameters.

For example, continuing with the above example, if a subset of available templates remaining after comparing the originating sources, the document preview apparatus 102 may apply a test condition regarding a usage parameter, such as device type. The above conditions are provided merely as examples and it will be appreciated that any condition relating to document attributes and/or usage parameters may be applied.

Moreover, in some examples, the hierarchy or order of conditions may be applied in a specific order, such as one based on efficiency. For example, applying a matching pattern against a document name may be more efficient than parsing a document for embedded document metadata. Therefore, the pattern matching condition may be tested prior to attempting to parse the document. Similar ordering may be applied to all or any of the conditions tested until a template is identified that is associated with the electronic document. In some examples, all possible conditions relating to document attributes may be tested prior to conditions relating to usage parameters, or vice versa.

As shown by operation 204, the electronic document preview apparatus 102 may include means, such as processing circuitry 20, processor 22, memory 24, or the like, for determining preview data from the electronic document based on the identified template.

As such, the electronic document preview apparatus 102 may determine preview data from the document as defined by the template. For example, the preview data may include any number of pertinent images extracted from an electronic document, any number of textual information, or a combination thereof. In some examples, the template may also define a format in which the preview data will be displayed, and/or any information pertaining to labeling or headings of the preview data.

In some examples, the electronic document preview apparatus 102 may determine the preview data based on whether the document is structured or unstructured. In some examples, the identified template may indicate whether the document is structured or unstructured. As another example, the electronic document preview apparatus 102 may attempt to parse a document. A parsable document may be identified as structured, while a document that cannot be parsed may be considered unstructured.

FIGS. 3 and 4, described hereinafter, provide detailed operations regarding how the electronic document preview apparatus 102 determines preview data from the electronic document. FIG. 3 provides detailed operations of the electronic document preview apparatus 102 for determining preview data from a structured document, while FIG. 4 provides detailed operations of the electronic document preview apparatus 102 for determining preview data from an unstructured document.

As mentioned above, the preview data may be determined from a template and may include or be associated with formatting information, such that the preview data is displayed in a format or positions that are defined by the template. In this regard, the preview data may include several data elements positioned according to the template. The preview data may therefore be collectively generated as an image for display.

Continuing to operation 206, the electronic document preview apparatus 102 may include means, such as processing circuitry 20, processor 22, communication interface 30, user interface 40, or the like, for causing display of the preview data. FIGS. 5A and 5B provide examples of document listings and respective preview data, and are described in further detail below.

The displayed document previews provide many advantages to the electronic document preview apparatus 102, and third party systems 110. To provide a document preview, the entire electronic document need not be rendered. In some examples, the electronic document preview apparatus 102, or any other apparatus, sub-system, or the like, may begin rendering the documents in their entirety as the document previews are being generated and displayed. In this regard, the document previews may be displayed more quickly than a completely rendered document. In some examples, the electronic document preview apparatus 102 may generate and provide the preview without rendering the complete document for viewing.

As shown by operation 208, in some examples, the document preview apparatus 102 may include means, such as processing circuitry 20, processor 22, communication interface 30, user interface 40, or the like, for generating preview metadata. The preview metadata may be considered any data used to recreate a document preview for display, without having to re-access the corresponding template. In some examples, the document preview apparatus 102 may transmit the preview metadata to the third party system 110 such that the third party system 110 may render the document preview for display.

The preview metadata may therefore be accessed by third party system 110, for example, to cache previews and re-generated previews on demand. The preview metadata may therefore include the preview data itself, and any information or data defining the format or layout of the data.

In some examples, the document preview apparatus 102 may embed the preview metadata in the electronic document itself, such that when a preview of the electronic document is subsequently requested, the document preview apparatus 102 and/or third party system 110 may extract the preview metadata from the electronic document and efficiently recreate the document preview. In such examples, if the electronic document preview apparatus 102 receives a request for a preview and determines the electronic document includes embedded preview data, operations 202 and/or 204 may be optionally bypassed such that the preview metadata may be extracted from the document, and the preview data may be generated accordingly. In such a scenario in which the preview metadata is embedded in the electronic document, the operations of FIG. 3 described below may also be optionally bypassed. The document preview apparatus 102 and/or third party system 110 may parse the document for the preview metadata such that the preview may be generated without having to access a template.

FIG. 3 is a flowchart of operations of the electronic document preview apparatus 102 for determining preview data from a structured document. As shown by operation 300, the electronic document preview apparatus 102 may include means, such as processing circuitry 20, processor 22, memory 24, communication interface 30, or the like, for determining the electronic document is a structured document. For example, the processor 20 may determine from the document name or type, or source from which the document was provided, that the document includes structured data. In this regard, the data may be provided within XML tags, and/or may include another format of predefined fields that may be extracted by a parser or other similar program.

As shown by operation 302, the electronic document preview apparatus 102 may include means, such as processing circuitry 20, processor 22, memory 24, or the like, for parsing discrete data from the electronic document. Because the data is in a structured format compatible with the electronic document preview apparatus 102, the processor 20 can parse the data and extract pertinent fields to be used in a document preview, as defined in the template.

As shown by operation 304, the electronic document preview apparatus 102 may include means, such as processing circuitry 20, processor 22, memory 24, or the like, for generating the preview data from the parsed discrete data based on the template. In this regard, a template may define which fields of the structured electronic document are pertinent such that the electronic document preview apparatus 102 can generate the document preview. In some examples, the format of the preview data may also be determined based on the template.

For example, when the electronic document preview apparatus 102 applies parsed data to a template associated with a lab result, the resulting preview data may include blood pressure, weight, cholesterol, and/or the like. When the electronic document preview apparatus 102 applies parsed data to a template associated with a monthly bill, the resulting preview data may include another set of data fields, such as lab bill amount, outstanding patient balance, and/or the like. In some examples, applying a different template to the same electronic document may yield different preview data, since different fields of the structured documents may be more relevant than others in certain uses. Similarly, a template associated with one user may yield different preview data than a template associated with a different user. Users may therefore customize templates according to their needs.

In some examples, the template may include headings so that a user can specifically identify a field of interest based on a familiar name as recognized by the user. In this regard, a user, system 110, or other entity may see a data field referred to by a different name in comparison to a different user, system or other entity viewing the same data field. In some examples, different templates could be generated based on a device type (e.g., mobile, personal computer, tablet, and/or the like), and/or location (inside a hospital, at a clinic, and/or the like).

In some examples, as shown by operation 306, the electronic document preview apparatus 102 may include means, such as processing circuitry 20, processor 22, memory 24, or the like, for processing multiple instances of the same parsed data element to determine which instance or instances of the parsed data element to include in the preview data (i.e., to apply to the selected template). In this regard, a document may include, as an example, several instances of measurements or test results, such as those taken on different dates. In this scenario, the electronic document preview apparatus 102 may determine that the most recent measurement or test result should be provided in the document preview. For example, if multiple XML elements with the same tag exist within a document, the electronic document preview apparatus 102 may be configured to determine which data element of the multiple elements having the same tag, should be included in the preview.

As another example, various rules as defined by the template may be applied to determine whether data field(s) from a structured document should be included in the preview data at all. For example, if a data element has changed significantly (e.g., more than a threshold amount of change) since a last known record, or has met, exceeded, fallen below some threshold level or amount, such as a predefined threshold, the preview data may include the particular field. In some examples, according to a template, if the electronic document preview apparatus 102 determines that a data value associated with a data field meets, exceeds, or falls below a threshold, the electronic document preview apparatus 102 may exclude the data field from the preview. Such rules may be customized or configured as provided by a template based on a usage parameter, such as on a per user, system, or entity basis, such that different users, systems, or entities may have different data appearing in a preview, even for the same electronic document. In some examples, rules may be defined for different device types (e.g., mobile, personal computer, tablet, and/or the like), and/or location (inside a hospital, at a clinic, and/or the like).

Parsing a structured document according to predefined definitions provides that the precise information that is important to a user can be extracted or derived from the document and displayed in the document preview.

As another example illustrated in FIG. 4, unstructured documents may also be processed by the electronic document preview apparatus 102 such that pertinent information may be displayed. As shown by operation 400, the electronic document preview apparatus 102 may include means, such as processing circuitry 20, processor 22, or the like, for determining the electronic document is an unstructured document. For example, the processor 20 may determine from the document name or type, or source from which the document was provided, that the document is not structured in any predefined format. The unstructured document may be a PDF (portable document format), image, of other file that may be rendered for viewing. In some examples, if the electronic document preview apparatus 102 cannot determine a format of the document, it may default to determining that the document is unstructured. In instances in which the electronic document preview apparatus 102 determines that a document is unstructured, the electronic document may be prefetched from memory, system 110, a database, and/or the like. In this regard, the electronic document preview apparatus 102 may, in some examples, selectively prefetch only the unstructured documents in order to generate preview data.

As shown by operation 402, the electronic document preview apparatus 102 may include means, such as processing circuitry 20, processor 22, memory 24, or the like, for identifying a location within the unstructured document that includes pertinent information based on the identified template. For example, a template may define an associated location within the document that contains the pertinent information for a specific scenario (e.g., provider X wants to see area Y of document type Z). The location may be defined by a relative position in the document (e.g., a right and uppermost area covering 100 by 100 pixels) or a predefined area at a specific position (e.g., an area covering 80 by 80 pixels located at a specific (x,y) coordinate within the document). Different users may have a different associated area of interest for a specific type of document or named document. A location of a preview for an unknown document type may default to a predefined area, such as a left and uppermost quadrant covering 200×100 pixels, for example.

As shown by operation 404, the electronic document preview apparatus 102 may include means, such as processing circuitry 20, processor 22, memory 24, or the like, for generating the preview data based on the location. As described above, based on the location identified, the subset or portion of the document may be considered the preview data, such that only the defined portion at the identified location is rendered in the preview. The electronic document preview apparatus 102 may employ different methods, based on the file type of the unstructured document, (e.g., JPEG (Joint Photographic Experts Group), or JIF (JPEG Interchange Format), for rendering the preview from the unstructured document. In this regard, in some examples, existing or known software may be used to render portions of the documents of known file types. In some examples, the electronic document preview apparatus 102 may provide a custom renderer to render a portion of an electronic document.

FIG. 5A provides an example listing of document names 500A and respective document previews 510A based on a particular usage parameter(s), such as for a particular user identify, system 110, or entity device type, or location. Document previews may include different data for different users, such as based on roles, user identifier, or facility at which the user works, for example. The different preview data derived from a particular document could therefore be different than the preview data taken from the same document in another instance based on a different usage parameter.

For example, FIG. 5B provides the same document listing 500A as in FIG. 5A, but different respective document previews 510B, in comparison to the document previews 510A of FIG. 5A. As an example, and as described above, a template associated with the user identity, or other usage parameter, may define what data is provided in the document preview associated with a particular document comprising structured data (e.g., Patient Chart 512). Similarly, the user identity, or other usage parameter, may be used to identify the area within a different document comprising unstructured data (e.g., Vital Signs 530) should be rendered in the document preview.

In this regard, the electronic document preview apparatus 102 may include means, such as processing circuitry 20, processor 22 or the like, for determining a usage parameter with which the preview data to be provided is associated, and identifying a particular template or display area that is associated with the usage parameter for each document to be previewed. The preview data may therefore be further determined based on the particular template/display area associated with the usage parameter(s). In some examples the usage parameter may be based on a user identity, which may be on an individual basis, such as a user logon. Additionally or alternatively, the user identity may be defined based on a group of users, such as a clinical unit, a system 110 from which the document is accessed, a specific medical facility accessing the document, organization and/or any other entity.

Consider FIGS. 5A and 5B. As shown in FIG. 5A, for the document 512 "Patient Chart," the electronic document preview apparatus 102 identifies the patient identifier and birthdate 520 as the preview data. Based on templates associated with different usage parameters, such as a different user, as shown in FIG. 5B, the electronic document preview apparatus 102 identifies images 522 as the preview data. In this example, the patient chart may be a structured document, and the images 522 may be defined by reference, such as with a URL (uniform resource locator) located within predefined tags within the electronic document. The patient identifier, birthdate, and other data may be similarly identified or parsed based on XML tags occurring in the document. A complete view of the document 512 is provided in FIG. 6.

As another example, for the document 530 "Vital Signs," which comprises unstructured data, the preview data in FIG. 5A includes images 540, while in FIG. 5B, a different image 542 is provided. FIG. 7A shows the locations 700 of the preview data outlined in a dashed line corresponding to the preview data of FIG. 5A. FIG. 7B shows that a different location 710 (defined by a dashed line) within the same document can be identified as preview data based on template associated with a different usage parameter, such as for a different user, user type, and/or the like.

While FIG. 3 provides operations of the electronic document preview apparatus 102 for generating previewing data of a structured electronic document, and FIG. 4 provides operations of the electronic document preview apparatus 102 for generating previewing data of an unstructured electronic document, it will be appreciated that the electronic document preview apparatus 102 may initiate the operations independently for different electronic documents according to example embodiments. As described above, the electronic document preview apparatus 102 may receive a plurality of electronic document indications as a result of a search or query. In some examples, the electronic document preview apparatus 102 may first collate and/or sort the electronic document indications by date and/or the like.

Therefore, the electronic document preview apparatus 102 may generate the preview data for only the first few documents in a list. As a user scrolls through the list, additional preview data may be generated or rendered for the associated electronic document as the document names or descriptions come into view. If the electronic document preview apparatus 102 determines that the document is structured and parsable, the electronic document preview apparatus 102 may generate and display the preview data without rendering or prefetching the entire document. In instances in which a document is unstructured, the electronic document preview apparatus 102 may selectively prefetch and/or render a portion of the document as described above with respect to FIG. 4.

Therefore, if a search query returns a large list of electronic document indications, the electronic document preview apparatus 102 may only generate preview data for only a subset of the list at any given time, such as for the first pre-defined number of documents in the list, or for the document name or descriptions within the display view. As a user scrolls down in the list, the electronic document preview apparatus 102 may generate additional document previews. Additional pre-fetches may occur gradually as the list is navigated. Therefore, the preview data may be provided while minimizing response time to retrieve and render all the documents in the list.

Embodiments provided herein additionally provide for customized previews of documents. In this regard, individual users or an administrator on behalf of a user group may configure what data is displayed in their document preview such as by selecting fields that occur in a structured document, and/or by specifying locations of interest in unstructured documents. Templates may be created such that various selected data can be positioned relative to each other for the electronic document preview apparatus 102 to generate the document preview as determined based on the template. The templates may or may not include additional information, such as custom headers or naming conventions for particular fields or images extracted from the electronic documents. According to example embodiments, clinicians, physicians, caregivers and other users can easily identify pertinent documents for clinical decision making without having to drill into each document to determine if there is data helpful to making a clinical decision. Clinical reviews and decision making can therefore be performed more efficiently with embodiments provided herein.

As such, the method, apparatus and computer program product provide numerous technical advantages including the conservation of processing resources and the associated power consumption otherwise expended to support the rendering of complete documents. Alternative methods without the use of embodiments provided herein may require a user to open documents, possibly one at a time, in search of the applicable or relevant documents. As another alternative, other document previewers may attempt to render the entire document or large portions of the document in a preview window, requiring extensive processing and having detrimental impacts to efficiency and resource consumption. Embodiments provided herein generate document previews so as permit the user to locate the desired files in a more expeditious and efficient manner, while having minimal or reduced toll on processing resources and computational efficiency, in comparison to alternative methods.

FIGS. 2, 3 and 4 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 24) storing instructions executable by a processor in the computing device (for example, by the processor 22). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, an electronic document preview apparatus 102 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, an electronic document preview apparatus 102 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an indication of an electronic document for which preview data is to be provided in a particular instance;
   determining that the electronic document is an unstructured document;
   determining a usage parameter characterizing a use of the preview data in the particular instance, wherein the usage parameter is at least one of a user identity of a user requesting the preview, a device type by which the preview data is requested, a location of a device by which the preview data is requested, or a network by which the preview data is requested;
   identifying a template associated with the electronic document, based on at least a document attribute associated with the electronic document and the at least one of the user identity of the user requesting the preview in the particular instance, the device type by which the preview data is requested in the particular instance, the location of a device by which the preview data is requested in the particular instance, or the network by which the preview data is requested in the particular instance;
   based on the template and in response to determining that the electronic document is an unstructured document, identifying at least one sub-portion of the electronic document, the at least one sub-portion of the electronic document determined based on at least a predefined size indicated by the template, relative to the electronic document, and a position indicated by the template, of the sub-portion relative to the electronic document; and
   with an electronic document preview apparatus comprising at least processing circuitry, determining the preview data from the electronic document based on the template and the identified at least one sub-portion.

2. The method of claim 1, wherein the template is identified based on at least the document attribute, wherein the document attribute comprises at least one of a document name, a providing source of the electronic document, or a file type associated with the electronic document.

3. The method of claim 1, wherein the position indicated by the template, of the sub-portion relative to the electronic document comprises a specific coordinate location within the electronic document, and wherein determining the preview data from the electronic document comprises obtaining the sub-portion from the specific coordinate location within the electronic document.

4. The method of claim 3, wherein the pre-defined size indicated by the template, relative to the electronic document, comprises a pixel height and a pixel width defined at the specific coordinate location, and wherein determining the preview data from the electronic document further comprises obtaining the sub-portion from the specific coordinate location and having the pixel height and the pixel width indicated by the template.

5. An apparatus comprising at least one processor and at least one memory including computer program code, the at least one memory and the computer program code configured to, with the processor, cause the apparatus to at least:
   receive an indication of an electronic document for which preview data is to be provided in a particular instance;
   determine that the electronic document is an unstructured document;
   determine a usage parameter characterizing a use of the preview data in the particular instance, wherein the usage parameter is at least one of a user identity of a user requesting the preview, a device type by which the preview data is requested, a location of a device by which the preview data is requested, or a network by which the preview data is requested;
   identify a template associated with the electronic document, based on at least a document attribute associated with the electronic document and the at least one of the user identity of the user requesting the preview in the particular instance, the device type by which the preview data is requested in the particular instance, the location of a device by which the preview data is requested in the particular instance, or the network by which the preview data is requested in the particular instance;
   based on the template and in response to determining that the electronic document is an unstructured document, identify at least one sub-portion of the electronic document, the at least one sub-portion of the electronic document determined based on at least a predefined size indicated by the template, relative to the electronic document, and a position indicated by the template, of the sub-portion relative to the electronic document; and
   determine the preview data from the electronic document based on the template and the identified at least one sub-portion.

6. The apparatus of claim 5, wherein the template is identified based on the document attribute, wherein the at least one document attribute comprises at least one of a document name, a providing source of the electronic document, or a file type associated with the electronic document.

7. The apparatus of claim 5, wherein in response to determining that the electronic document is a structured document, determining preview data comprises:
   parsing discrete data from the electronic document based on the template; and
   generating the preview data based on the parsed discrete data and the template.

8. The apparatus of claim 7, wherein the discrete data comprises multiple instances of a same data element, and the parsing further comprises:
   processing the multiple instances of the same data element to determine which instance or instances to include in the preview data.

9. The apparatus of claim 5, wherein the location identified within the electronic document comprises a specific coordinate location within the electronic document.

10. The apparatus of claim 9, wherein the location comprises an area pixel height and a pixel width defined at the specific coordinate location, wherein the preview data is within the area.

11. A computer program product comprising at least one non-transitory computer-readable medium having computer-readable program instructions stored therein, the computer-readable program instructions comprising instructions, which when performed by an apparatus, are configured to cause the apparatus to perform at least:
receive an indication of an electronic document for which preview data is to be provided in a particular instance;
determine that the electronic document is an unstructured document;
determine a usage parameter characterizing a use of the preview data in the particular instance, wherein the usage parameter is at least one of a user identity of a user requesting the preview, a device type by which the preview data is requested, a location of a device by which the preview data is requested, or a network by which the preview data is requested;
identify a template associated with the electronic document, based on at least one document attribute associated with the electronic document and the usage parameter relating to the at least one of the user identity of the user requesting the preview in the particular instance, the device type by which the preview data is requested in the particular instance, the location of a device by which the preview data is requested in the particular instance, or the network by which the preview data is requested in the particular instance;
based on the template and in response to determining that the electronic document is an unstructured document, identify a at least one sub-portion of the electronic document, the sub-portion of the electronic document determined based on at least a predefined size indicated by the template, relative to the electronic document, and a position indicated by the template, of the sub-portion relative to the electronic document; and
determine the preview data from the electronic document based on the template and the identified at least one sub-portion.

12. The computer program product of claim 11, wherein the template is identified based on the document attribute, wherein the document attribute comprises at least one of a document name, a providing source of the electronic document, or a file type associated with the electronic document.

13. The computer program product of claim 11, wherein in response to determining that the electronic document is a structured document, determining preview data comprises:
parsing discrete data from the electronic document based on the template; and
generating the preview data based on the parsed discrete data and the template.

14. The computer program product of claim 13, wherein the discrete data comprises multiple instances of a same data element, and the parsing further comprises:
processing the multiple instances of the same data element to determine which instance or instances to include in the preview data.

\* \* \* \* \*